Patented Aug. 20, 1940

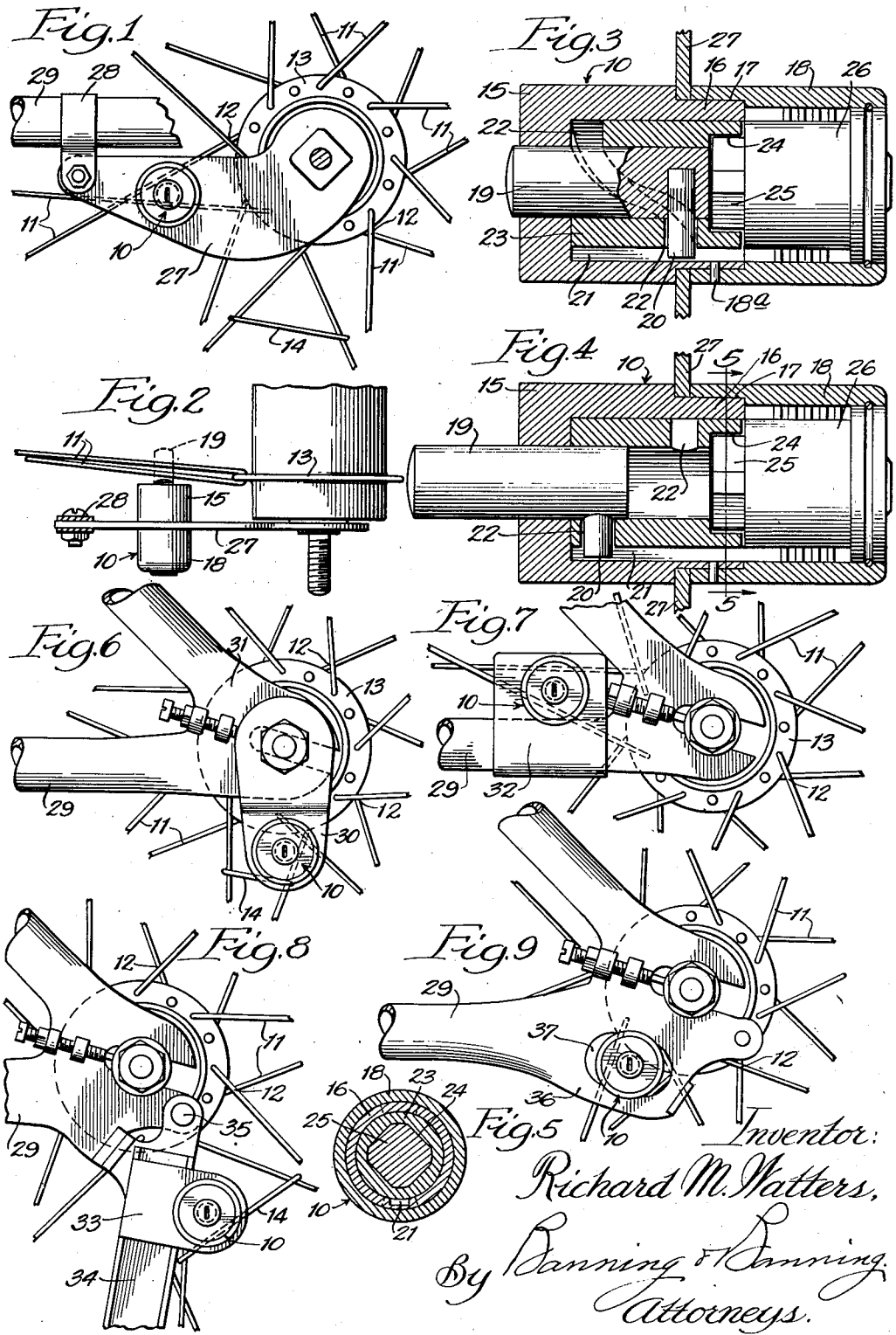

2,212,428

UNITED STATES PATENT OFFICE 2,212,428

BICYCLE LOCK

Richard M. Watters, Chicago, Ill., assignor to The Illinois Lock Co., Chicago, Ill., a corporation of Illinois Application October 14, 1938, Serial No. 234,865

3 Claims. (Cl. 70—227)

The lock of the present invention is designed for application to the rear portion of the frame of a bicycle, or to some part or member associated with the frame for the purpose of projecting a bolt inwardly between the spokes of the wheel so as to prevent rotation thereof and thus protect the bicycle against unauthorized use.

The invention is one which may be variously applied to the bicycle since it requires that the lock be so located as to introduce an obstruction to the rotation of the wheel and various modes of securing the lock in place are shown by way of exemplification of the principles of the invention.

In the drawing, Figure 1 is a fragmental view showing the rear portion of a bicycle frame with the brake arm utilized as a mounting for the lock;

Fig. 2 is a vertical plan view showing the manner in which the bolt is projected inwardly between the spokes of the rear wheel;

Figs. 3 and 4 are enlarged sectional details of the lock showing the bolt in its retracted position in Fig. 3 and in its projected position in Fig. 4;

Fig. 5 is a cross-sectional view of the lock taken on line 5—5 of Fig. 4; and

Figs. 6, 7, 8 and 9 are views in each case showing the rear portion of a bicycle frame and illustrating various modifications in the method of mounting the lock of the present invention.

The lock 10 of the present invention is so located as to project its bolt into the space between adjacent spokes 11, preferably on the rear of the bicycle. The spokes shown are arranged in crisscross relation to one another in the conventional manner with the inner ends of associated pairs of spokes in intersecting relation at the points 12 immediately adjacent the rim of the hub 13. In order to more firmly anchor the associated spokes of an intersecting pair to afford greater rigidity at points adjacent the lock, it may be desirable to provide tie wires 14 which engage the diverging spokes of a pair, as shown in Fig. 1, at a short distance outside the margin of the hub and in position to bring the bolt of the lock into the space within the confines of the tie wire. The tie wires in question, however, may be dispensed with if the spokes are reasonably stiff and this feature is not, therefore, regarded as essential to the successful employment of the invention.

The lock 10 consists of a cylindrical casing comprising an inner barrel 15 provided with a reduced neck 16 at its outer end which is socketed within a recess 17 in the outer barrel 18 of the casing, the parts being preferably locked together in any approved way as by one or more cross pins 18ª. The inner and outer barrels are fitted together to embrace a portion of the rear frame or some part or element associated with the rear frame so that the casing of the lock will be rigidly secured to the frame of the bicycle.

The lock is provided with a bolt 19 which normally stands in retracted relation, as in Fig. 3, but will be projected inwardly as in Fig. 4. The bolt is provided with a laterally projecting pin 20, the outer end of which enters a longitudinal groove 21 in the wall of the inner barrel, being projected through a spiral groove 22 in a sleeve 23, which sleeve is rotatable within the barrel, the parts being so arranged that upon rotation of the sleeve, the bolt will be held against rotation but compelled to move longitudinally of the sleeve.

The outer end of the sleeve is provided with a squared socket 24 which receives a squared block 25 operated in any conventional manner by the plug 26 which carries the tumblers and which can be rotated only when the key has been inserted. The details of the tumbler construction are not regarded as a part of the present invention so that a full description thereof is deemed unnecessary.

As before stated, the inner end and outer barrels of the lock casing are fitted to engage and clamp against some convenient portion of the frame or a part associated with the frame. In Fig. 1 I have shown the lock as carried by the brake arm 27 which supports and carries a part of the hub brake mechanism. As shown, the forward end of the hanger bar is secured by a clip 28 to the lower rail 29 of the bicycle frame. In Fig. 6 the lock is carried by a hanger plate 30 which is secured to the forked rear end 31 of the bicycle frame. In Fig. 7 I have shown the lock as carried by a plate 32 mounted upon the lower frame rail 29. In Fig. 8 I have shown the lock as carried by a clip 33 which in turn is mounted upon the yoke-shaped rest or support 34 which is pivoted to the frame by a pivot pin 35 and is adapted to be swung down to afford a rest or support for the bicycle when parked. In Fig. 9 I have shown the lock carried by an extension or protuberance 36 on the frame itself, and in this instance, the lock casing is entered through a somewhat elongated slot 37 which permits adjustment of the casing to the extent required to permit the bolt when projected to clear the points of intersection 12 of the wheel spokes so as to permit the bolt to be thrown at any point in the rotation of the wheel.

The above examples serve to illustrate various ways in which the lock may be mounted and secured to the frame or to parts associated therewith in such a way as to afford a firm and rigid mounting for the lock in a proper location to permit the bolt to be thrown in intersecting relation with the wheel spokes, but it will be understood that the particular method of mounting or inserting the lock in place will depend upon the construction of the bicycle frame or parts associated therewith so that it is not the intention to limit the mounting for the lock to the particular arrangements shown or to the details of construction of the lock itself except insofar as these features may be specifically set forth in the claims.

The invention is one which may be readily applied to bicycles of various descriptions since the construction of the lock permits the barrel sections to be fitted together and thereafter permanently secured in such a way as to clamp the lock in position within or upon the frame irrespective of the structure of the frame itself and without in any manner weakening the frame or interfering with the operation of the working portions of the bicycle.

I claim:

1. In combination with the frame and spoked wheel of a bicycle, a lock consisting of inner and outer barrel sections telescopically interfitting one within the other to form a casing, one of said sections being entered through a relatively thin platelike part fixedly related to the frame and bearing against one face of said part and the other lock section bearing against the opposite face of said part to clamp the lock rigidly with relation to the frame, each barrel section carrying a portion of the lock mechanism and said lock mechanism including a bolt carried by the casing and adapted when projected to enter between the spokes of the wheel, and tumbler controlled means within the lock and adapted to be operated by a key for actuating the bolt.

2. In combination with the frame and spoked wheel of a bicycle, a lock consisting of inner and outer barrel sections telescopically interfitting one within the other to form a casing, one of said sections being entered through a relatively thin plate-like part fixedly related to the frame and bearing against one face of said part and the other lock section bearing against the opposite face of said part to clamp the lock rigidly with relation to the frame, a bolt carried by the casing and adapted when projected to enter between the spokes of the wheel, means carried by the inner barrel section for imparting reciprocatory movement to the bolt, and tumbler controlled means carried by the outer barrel section and adapted to be operated by a key for imparting movement to the bolt actuating means.

3. A bicycle lock consisting of a cylindrical casing adapted to be mounted on the frame of a bicycle adjacent a wheel thereof and provided at its inner portion with a longitudinal groove, a cylindrical bolt slidable through the inner end of the casing and adapted to be projected into engagement with said wheel, said bolt being provided at its inner portion with a laterally projecting pin extending into the groove of the casing whereby the bolt is held against rotary movement, a rotary sleeve arranged within the inner portion of the casing and provided with a spiral slot receiving the laterally extending pin of the bolt, the latter being actuated when the sleeve is rotated, said sleeve being provided at its outer end with a polygonal socket, and a key controlled plug mounted for rotary movement within the outer portion of the casing and provided at its inner end with a polygonal lug fitting the polygonal socket of the sleeve, whereby rotation of the plug imparts rotary movement to the sleeve.

RICHARD M. WATTERS.